(12) United States Patent
Testa et al.

(10) Patent No.: US 8,861,955 B2
(45) Date of Patent: Oct. 14, 2014

(54) OPTICAL COMMUNICATIONS NETWORK NODE AND METHOD OF CONTROLLING DATA TRANSMISSION BETWEEN OPTICAL COMMUNICATIONS NETWORK NODES

(75) Inventors: Francesco Testa, Pomezia (IT); Marzio Puleri, Fiano Romano (IT); Roberto Sabella, Grottaferrata (IT); Patrizia Testa, Valmontone (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 606 days.

(21) Appl. No.: 13/147,037
(22) PCT Filed: Jan. 29, 2009
(86) PCT No.: PCT/EP2009/051034
§ 371 (c)(1),
(2), (4) Date: Oct. 11, 2011
(87) PCT Pub. No.: WO2010/086019
PCT Pub. Date: Aug. 5, 2010

(65) Prior Publication Data
US 2012/0033968 A1     Feb. 9, 2012

(51) Int. Cl.
*H04J 14/00* (2006.01)
*H04J 14/02* (2006.01)
*H04Q 11/00* (2006.01)

(52) U.S. Cl.
CPC ......... *H04J 14/0227* (2013.01); *H04J 14/0212* (2013.01); *H04J 14/0279* (2013.01); *H04J*
(Continued)

(58) Field of Classification Search
CPC .......... H04Q 11/0005; H04Q 11/0066; H04Q 11/0071; H04Q 11/0062; H04Q 11/0001; H04Q 3/0004; H04Q 3/0016; H04Q 3/0025; H04Q 3/0062; H04Q 3/0066; H04Q 3/521; H04Q 3/526; H04Q 3/528; H04Q 2011/0005; H04Q 2011/0011; H04Q 2011/0013; H04Q 2011/0015; H04Q 2011/0018; H04Q 2011/0024; H04Q 2011/0039; H04Q 2011/0064; H04J 14/0204; H04J 14/0205; H04J 14/021; H04J 14/0212; H04J 14/0213; H04J 14/0227; H04J 14/0257; H04J 14/0267

USPC ............ 398/45, 46, 50, 51, 54, 55, 56, 12, 19
See application file for complete search history.

(56) References Cited

U.S. PATENT DOCUMENTS 6,956,868 B2 * 10/2005 Qiao .............................. 370/466
7,190,898 B2 * 3/2007 Kim et al. ....................... 398/51
(Continued)

FOREIGN PATENT DOCUMENTS

| CN | 1462127 A | 12/2003 |
|---|---|---|
| CN | 1691551 A | 11/2005 |
| EP | 1 367 754 | 12/2003 |

OTHER PUBLICATIONS

White et al, "A Summary of the HORNET Project: A Next-Generation Metropolitan Area Network", IEEE Journal on Selected Areas in Communications, vol. 21, No. 9, Nov. 2003, pp. 1479-1494.

(Continued)

*Primary Examiner* — M. R. Sedighian
(74) *Attorney, Agent, or Firm* — Baker Botts, LLP

(57) ABSTRACT

An optical communications network node (10) comprising an optical transmitter module (16), an optical receiver module (12), an electrical cross-point switch (20) and control apparatus (24, 26). The optical transmitter module (16) comprises optical sources (18) each having a different operating wavelength and each being selectively assignable as an optical circuit switching channel source or an optical burst switching channel source. The optical receiver module (12) comprises a said plurality of optical detectors each operable at one of said operating wavelengths. The electrical cross-point switch (20) comprises switch paths (22) and is configurable to allocate a first set of switch paths for optical circuit switching and a second set of switch paths for optical burst switching. The control apparatus (24, 26) configures the switch paths (22), separates data traffic to be dropped from transit data traffic, and schedules data traffic for transmission on optical burst switching channels to the respective sources (18).

28 Claims, 4 Drawing Sheets

(52) U.S. Cl.
CPC . 14/0267 (2013.01); *H04J 14/0213* (2013.01); *H04J 14/0205* (2013.01); *H04Q 11/0005* (2013.01); *H04J 14/0257* (2013.01); *H04J 14/0204* (2013.01); *H04Q 11/0066* (2013.01); *H04J 14/021* (2013.01); *H04J 14/0246* (2013.01); *H04Q 11/0071* (2013.01)
USPC .................... 398/46; 398/45; 398/51; 398/54

(56) References Cited

U.S. PATENT DOCUMENTS

| | | | | |
|---|---|---|---|---|
| 7,272,310 | B2 * | 9/2007 | Maciocco et al. | 398/47 |
| 7,280,478 | B2 * | 10/2007 | Oh et al. | 370/235 |
| 7,499,650 | B2 * | 3/2009 | Wang et al. | 398/53 |
| 7,826,747 | B2 * | 11/2010 | Su et al. | 398/83 |
| 7,995,914 | B2 * | 8/2011 | So | 398/5 |
| 8,634,430 | B2 * | 1/2014 | Rabbat et al. | 370/412 |
| 2003/0223405 | A1 * | 12/2003 | El-Bawab | 370/352 |
| 2007/0242691 | A1 * | 10/2007 | Rhee et al. | 370/465 |

OTHER PUBLICATIONS

International Search Report for PCT/EP2009/051034, mailed Jul. 28, 2009.
Written Opinion of the International Searching Authority for PCT/SE2008/000754, mailed Sep. 17, 2009.
Wei Wei et al., "High-Performance Hybrid-Switching Optical Router for IP over WDM Integration" Photonic Network Communications, vol. 9, No. 2, pp. 139-155, (Mar. 1, 2005).
Chinese Office Action and English translation thereof mailed Jun. 19, 2013 in Chinese Application 200980156034.7.

* cited by examiner

OPTICAL COMMUNICATIONS NETWORK NODE AND METHOD OF CONTROLLING DATA TRANSMISSION BETWEEN OPTICAL COMMUNICATIONS NETWORK NODES

This application is the U.S. national phase of International Application No. PCT/EP2009/051034, filed 29 Jan. 2009, the entire contents of which is hereby incorporated by reference.

FIELD OF THE INVENTION

The invention relates to an optical communications network node and to a method of controlling data transmission between optical communications network nodes.

BACKGROUND OF THE INVENTION

Most known metro wavelength division multiplexed (WDM) networks are based on optical rings that include various types of optical add-drop multiplexers (OADMs), which perform drop and add functions through an optical filtering operation. Most metro WDM networks are substantially based on optical circuit switching, and the granularity is wavelength, however optical burst switching (in which a number of data packets are assembled into a data burst for transmission) based metro WDM networks have recently emerged based on agile utilization of optical tunable sources and fixed wavelength receivers.

Reconfigurable Optical Add Drop Multiplexer (ROADM) nodes in ring networks have been developed to transport transit data traffic travelling on multiple wavelength signals without optical-electrical-optical (OEO) conversion, which switch only data traffic addressed to a specific node. When a new node is added to the network, new transponders have to be included in each of the existing nodes, since each wavelength is dedicated for communication to a specific node.

Ring network nodes based on optical burst switching have been proposed [Ian M. White et al, "A Summary of the HORNET Project: A Next-Generation Metropolitan Area Network", IEEE JSAC, Vol. 21, N. 9, November 2003], including the Matisse Networks EtherBurst node which comprises a single fast tunable optical transmitter and a fixed wavelength receiver to drop traffic addressed to that node. Optical burst switching channels are implemented by rapidly tuning the wavelength of the laser to the wavelength of a destination node. Medium access control (also known as Media Access Control) (MAC) protocols are used to assign resources among a number of such nodes forming a ring network.

SUMMARY OF THE INVENTION

It is an object to provide an improved optical communications network node and an improved method of controlling data transmission between optical communications network nodes.

A first aspect of the invention provides an optical communications network node comprising an optical transmitter module, an optical receiver module, an electrical cross-point switch and control apparatus. The optical transmitter module comprises a plurality of optical sources each having a different substantially fixed operating wavelength. Each optical source is selectively assignable as an optical circuit switching channel source or an optical burst switching channel source. The optical receiver module comprises a said plurality of optical detectors. Each optical detector is operable at one of said different substantially fixed operating wavelengths. The electrical cross-point switch is coupled between said optical receiver module and said optical transmitter module. The electrical cross-point switch comprises a second plurality of switch paths and is selectively configurable to allocate a selected first set of said switch paths for optical circuit switching and to allocate a selected second set of said switch paths for optical burst switching. The control apparatus is arranged to configure the said switch paths to allocate paths to said first and second sets. The control apparatus is also arranged to separate data traffic to be dropped at the node from transit data traffic. The control apparatus is also arranged to schedule data traffic for transmission on optical burst switching channels to the said optical sources assigned as optical burst switching channel sources.

The control apparatus thereby routes transit traffic to the optical transmitter module for forwarding on and routes traffic to be dropped to the upper layers of the network node. The control apparatus also thereby sets semi-permanent paths through the cross-point switch for traffic to be routed on optical circuit switching channels. The available wavelengths can be distributed in a semi-permanent fashion between circuit and burst switching traffic allowing fast and simple reconfiguration of a network.

The optical communications network node can be configured to route data traffic on both optical circuit switching channels and optical burst switching channels simultaneously, and can be reconfigured to vary the number of sources allocated as circuit switching channel sources and as burst switching channel sources, enabling the node operation to migrate from circuit switching to hybrid circuit and burst switching, and to full burst switching with minimum capital expenditure.

The optical communications network node may be used in any known network topology, such as a ring network or a mesh network.

In an embodiment, the control apparatus comprises: a first controller arranged to configure switch paths in said first set; and a second controller arranged to configure the said switch paths in said second set, and to schedule data traffic for transmission on optical burst switching channels to the said optical sources assigned as optical burst switching channel sources. The first and second controllers thereby act to separate data traffic to be dropped at the node from transit data traffic.

In an embodiment the optical detectors comprise photodiodes and the optical receiver module further comprises an optical input coupled to the photodiodes via a wavelength division multiplexer. The optical receiver module may be provided in the form of a photonic integrated circuit.

In an embodiment the optical sources each comprise a laser source and a driver operable to selectively apply data modulation to the laser source. Each laser source may thereby be operated as an optical circuit switching channel source or as an optical burst switching channel source. The optical transmitter module may be provided in the form of a photonic integrated circuit.

The use of photonic integrated circuits allows more compact, robust and reliable node implementation and permits low cost OEO conversion, making layer 1 electronic processing of all wavelengths affordable.

In an embodiment the second controller is further arranged to configure the said switch paths such that received multicast data traffic is both dropped at the said network node and forwarded to the optical transmitter module. Multicasting of data can therefore be performed using the optical communications network node without requiring any multiplication of connections.

The optical communications network node may further comprise a circuit switch arranged to route ingress data traffic for one or more of said optical circuit switching channels to the electrical cross-point switch and a packet switch arranged to route ingress data traffic for one or more of said optical burst switching channels to the electrical cross-point switch. The circuit switch may be further or alternatively arranged to route egress circuit switching data traffic from the electrical cross-point switch and the packet switch may be further or alternatively arranged to route egress burst data traffic from the electrical cross-point switch.

The electrical cross-point switch is thereby able to cross-connect ingress data from the circuit switch and the packet switch to respectively assigned optical sources for transmission on optical circuit switching channels and optical packet switching channels respectively, and is able to cross-connect egress circuit data to the circuit switch and egress burst data the packet switch.

Segregation of transit traffic is therefore provided at layer 1, which allows a reduction in the sizes of packet and the circuit switches (layer 2) required to route local traffic within the node, since only data to be switched locally needs to be processed by the packet and circuit switches.

In an embodiment the second controller is arranged to identify one or more time windows available for data transmission by one or more of said optical burst switching channel sources and to allocate said data traffic to said time windows. The second controller is arranged to determine the optical burst switching channel source by which the data is to be transmitted, and thus the wavelength on which it is to be transmitted, by the availability of optical transmission bandwidth. The second controller is further arranged to vary the duration of the or each time window depending upon the amount of data to be transmitted within the said window. The second controller may be further arranged to assemble packet data for transmission by the said burst switching channel sources into data bursts based on destination information provided within the said data. The second controller may be further arranged to assemble packet data into bursts depending upon quality of service (QoS) information provided within the said data. In one embodiment, the second controller is arranged to assemble a number of packets of data all to be routed to the same destination into a larger data burst for transmission by a single burst switching data channel source (on a single wavelength channel) in a single time window. In an alternative embodiment, the second controller is arranged to allocate data to be routed to the same destination to more than one optical burst switching channel source for transmission within a single time window.

The second controller thereby enables data routing based on a dynamic multigranular sub-wavelength bandwidth allocation which efficiently utilizes the optical resources of the optical communications network node and guarantees the QoS of the network. This means that optical burst switching wavelengths can be assigned to any destination node. Transmission opportunities to destination nodes on optical burst switching channels are granted according to their bandwidth demand and QoS requirements; available bandwidth is assigned to destination nodes during set-up on the basis of traffic characteristics. The optical bandwidth is assigned to destination nodes by the second controller using data bursts of different size according to traffic load and bandwidth availability, and the same wavelength can be used to transmit data bursts with different source and/or destination nodes within a network, such that each wavelength can be shared by connections between different nodes during the same time window.

The optical communications network node is therefore able to allocate any one or more of the optical burst switching channel sources for transmission of data, and data to be transmitted may be assembled into data bursts having a duration of more than one time window, or may be distributed across a plurality of the optical burst switching channels within a single time window, in order to optimize utilisation of the available bandwidth. Wastage of bandwidth and latency within the network due to the variable data loading of traffic is thereby minimized. Due to the existence of a matching array of optical sources and optical receivers at each network node, the node is able to dynamically assign the available bandwidth across all of the optical burst switching channel sources, since each destination node can receive data on each optical burst switching channel (i.e. at each wavelength) and therefore data can be transmitted to the or each destination node on any of the said optical burst switching channels. The assignment of a wavelength to a destination node is therefore highly dynamic and the availability of parallelism in transmission enables optimization of network resources, minimizing congestion within a network.

A plurality of the optical communications network nodes can thus be utilized to form an optical communications network in which the addition of a further node does not require the addition of further optical transmitter modules and optical receiver modules (transponders) to the existing nodes.

In an embodiment the optical communications network node further comprises an optical add-block-drop module provided between an input of the said network node and the said optical receiver module and between the said optical transmitter module and an output of the said network node, the optical add-block-drop module being arranged to optically separate transit data traffic from data traffic to be dropped at the said network node and to selectively block one or more wavelength channels corresponding to dropped data traffic, and the second controller is further arranged to configure the optical add-block-drop module to selectively block the said wavelength channels corresponding to dropped data traffic.

The optical add-block-drop module is therefore selectively configurable to block wavelength channels to be dropped, enabling the said wavelengths to be reused by the node for transmitting data. The optical add-drop-block module is also selective configurable to transmit multicast channels which are to be both dropped at the node and transmitted onwards. Multicasting of data can therefore be performed using the optical communications network node without requiring any multiplication of connections.

The optical add-block-drop module may comprise an optical splitter, a wavelength demultiplexer, a plurality of optical switches selectively configurable to block said one or more wavelength channels, a wavelength multiplexer and an optical coupler, the optical splitter being arranged to direct a first portion of a received optical signal to the said optical switches and to direct a remaining portion of the said received optical signal to the optical receiver module. The optical switches may comprise semiconductor optical amplifiers. The use of semiconductor optical amplifiers enables the optical switches to operate with a fast response time. The optical add-block-drop module may be provided in the form of a photonic integrated circuit.

The second controller may be further arranged to configure the said optical switches to selectively block said one or more wavelength channels. The second controller may be further arranged to configure the said paths of the electrical cross-point switch to discard transit data traffic provided by the said remaining portion of the said received optical signal.

In an embodiment, the second controller comprises a medium access controller.

A second aspect of the invention provides a method of controlling data transmission between optical communications network nodes of an optical communications network. Each said node comprises an optical receiver module, an optical transmitter module, and an electrical cross-point switch. The optical receiver module comprises an optical receiver module comprising a plurality of optical detectors each having a different substantially fixed operating wavelength. The optical transmitter module comprises a said plurality of optical sources each having one of said different substantially fixed operating wavelengths. The electrical cross-point switch is coupled between said optical receiver module and said optical transmitter module and comprises a second plurality of switch paths. The method comprises:

assigning a first set of said optical sources as optical circuit switching channel sources and assigning a second set of said optical sources as optical burst switching channel sources;

allocating a first set of said switch paths as optical circuit switching paths and allocating a second set of said switch paths as optical burst switching paths;

configuring the said switch paths to separate data traffic to be dropped at the said node from transit data traffic; and scheduling data traffic for transmission on optical burst switching channels to the said optical sources assigned as optical burst switching channel sources.

In an embodiment, the method comprises configuring the said switch paths such that received multicast data traffic is both dropped at the said network node and forwarded to the optical transmitter module.

In an embodiment the method comprises identifying one or more time windows available for data transmission by one or more of said optical burst switching channel sources and allocating said data traffic to said time windows. The method may comprise determining the optical burst switching channel source by which the data is to be transmitted, and thus the wavelength on which it is to be transmitted, by the availability of optical transmission bandwidth. The method may vary the duration of the or each time window depending upon the amount of data to be transmitted within the said window.

In an embodiment, the method comprises allocating a said time window to the said data according to a required optical bandwidth demand of the said data traffic. The method may comprise allocating an available optical bandwidth to the or between each destination node according to one or more traffic characteristics of the data to be transmitted, including one or more of: guaranteed data rate; maximum data rate; maximum data burst size; maximum delay; and maximum jitter.

In an embodiment, the method comprises assembling data for transmission by the said burst switching channel sources into data bursts based on destination information provided within the said data. The method may assemble packet data into bursts depending upon quality of service information provided within the said data. In one embodiment, the method comprises assembling a number of packets of data all to be routed to the same destination into a data burst for transmission by a single burst switching data channel source, on a single wavelength channel, in a single time window. In an alternative embodiment, the method comprises allocating data to be routed to the same destination to more than one optical burst switching channel source for transmission within a single time window.

The method is therefore able to allocate any one or more of the optical burst switching channel sources for transmission of burst data, and burst data to be transmitted may be assembled into larger data bursts having a duration of more than one time window, or may be distributed across a plurality of the optical burst switching channels within a single time window, in order to optimize utilisation of the available bandwidth. Wastage of bandwidth and latency within the network due to the variable data loading of traffic is thereby minimized. Due to the existence of a matching array of optical sources and optical receivers at each network node the method is able to dynamically assign the available bandwidth across all of the optical burst switching channel sources, since each destination node can receive data on each optical burst switching channel (i.e. at each wavelength) and therefore data can be transmitted to the or each destination node on any of the said optical burst switching channels.

In an embodiment the optical communications network node further comprises an optical add-block-drop module provided between an input of a said network node and the said optical receiver module and between the said optical transmitter module and an output of a said network node and the method further comprises configuring the optical add-block-drop module to selectively block wavelength channels corresponding to data traffic to be dropped at the said network node.

In an embodiment, the optical add-block-drop module comprises a plurality of optical switches selectively configurable to block one or more wavelength channels and the method comprises configuring the said optical switches to selectively block said one or more wavelength channels.

In an embodiment, the method configures the said switch paths to separate data traffic to be dropped at the said node from transit data traffic by configuring the said paths of the electrical cross-point switch to discard transit data traffic.

In an embodiment, the method is implemented by a control protocol provided to a said node via a layer of said optical communications network. The control protocol may comprise a medium access control protocol and the said layer may comprise the medium access control layer of the said optical communications network.

A third aspect of the invention provides a computer program product comprising program code for performing any of the above steps of the method of controlling data transmission between optical communications network nodes of an optical communications network.

A fourth aspect of the invention provides a data carrier having computer readable instructions embodied therein for providing access to resources available on a computer. The computer readable instructions comprise instructions to cause the computer to perform any of the above steps of the method of controlling data transmission between optical communications network nodes of an optical communications network.

Embodiments of the invention will now be described in detail, by way of example only, with reference to the accompanying drawings.

DESCRIPTION OF EMBODIMENTS OF THE INVENTION

Figure 1:
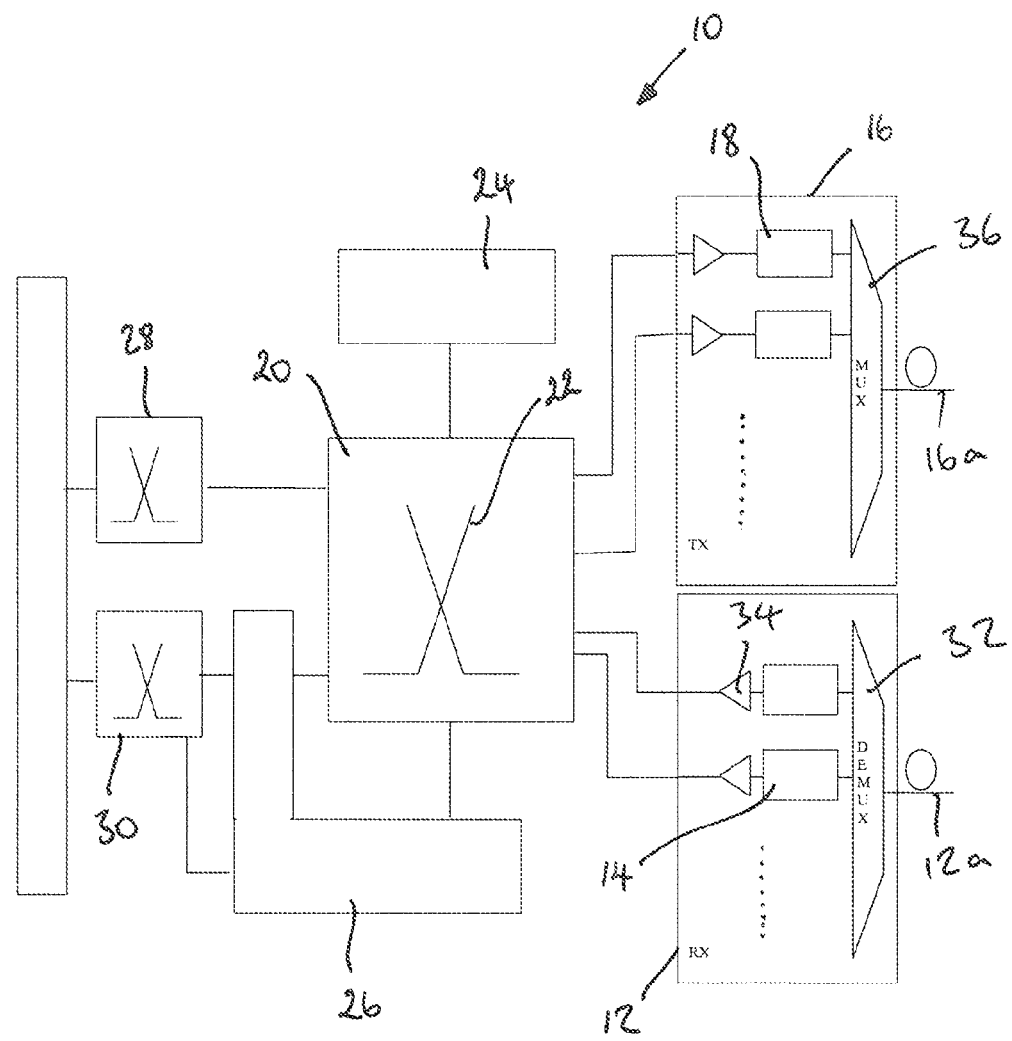
FIG. 1 is a schematic representation of an optical communications network node according to a first embodiment of the invention.

Referring to FIG. 1, a first embodiment of the invention provides an optical communications network node 10 comprising an optical receiver module 12, an optical transmitter module 16, an electrical cross-point switch 20, and control apparatus in the form of a first controller 24 and a second controller 26.

The optical transmitter module 16 in this example comprises an array of ten optical sources 18, in the form of distributed feedback (DFB) lasers. Only two of the DFB lasers 18 are shown in the drawing for reasons of clarity. Each DFB laser 18 operates at a different substantially fixed operating wavelength, each wavelength being an ITU-T grid wavelength. The optical transmitter module 16 further comprises an optical output 16a to which the optical signals from the laser sources 18 are coupled by means of a wavelength multiplexer 36.

Each of the DFB lasers 18 is provided with a driver (not shown) by which it can be operated in an optical circuit switching mode or in a burst switching mode. The DFB laser drivers apply data traffic in the electrical domain directly to the DFB laser outputs, producing optical modulation of the DFB laser output, in the normal way, which will be well understood by the person skilled in the art. For DFB lasers 18 assigned to optical burst switching channels, the optical modulation applied to the DFB laser 18 is switched on/off rapidly in order to facilitate transmission of data bursts. It will be appreciated by the person skilled in the art that the data traffic may alternatively be applied to an optical carrier generated by a DFB laser by an external modulator, such as an electro-absorption modulator (EAM). The operation of EAMs to apply data to an optical carrier will be well known to the person skilled in the art and so will not be described in detail here.

The optical receiver module 12 comprises, in this example, a matching array of ten optical detectors 14, in the form of photodiodes, each configured to receive at a corresponding one of the operating wavelengths. Only two of the photodiodes 14 are shown in the drawing for reasons of clarity. The optical receiver module 12 further comprises an optical input 12a, coupled to the photodiodes 14 by means of a wavelength de-multiplexer 32. The electrical signals output from each of the photodiodes are coupled to low noise amplifiers 34 and buffers. All received optical data traffic signals are thereby converted to electrical signals, and further processing of the signals by the node 10 is performed in the electrical domain.

In this example, the optical receiver module 12 and the optical transmitter module are provided as photonic integrated devices, with the DFB lasers 18 being provided in a single InP array.

Each DFB laser 18 is selectively assignable as an optical circuit switching channel source or as an optical burst switching channel source. The wavelengths available within the node 10 can therefore be distributed in a semi-permanent fashion between circuit and burst switching traffic, to allow fast and simple reconfiguration of a network comprising the node 10. The node 10 can be configured to route data traffic on both optical circuit switching channels and on optical burst switching channels simultaneously, and can be reconfigured to vary the number of the DFB lasers 18 allocated as circuit switching channels sources and as burst switching channel sources. The node 10 can thereby be operated in a full circuit switching mode, a hybrid circuit and burst switching mode, or a full burst switching mode, with minimal capital expenditure costs.

The electrical cost-point switch 20 is coupled between the optical receiver module 12 and the optical transmitter module 16. The electrical cross-point switch 20 is also coupled to the circuit switch 28 configured to route local circuit switched traffic to be added/dropped at the node 10 and a packet switch 30 configured to route local packet switching traffic to be added/dropped at the node 10. The electrical cross-point switch 20 comprises a plurality of switch paths 22, and is selectively configurable to allocate a first set of the switch paths 22 for optical circuit switching and a second set of the switch paths for optical burst switching. Semi-permanent paths can thereby be set through the cross-point switch for traffic to be routed on optical circuit switching channels. The switch paths 22 are further configurable to route transit data traffic directly from the optical receiver module 12 to the optical transmitter module 16, such that transit data traffic is only processed by layer 1 of the node 10 and is not routed or processed by upper layer switches (layer 2 switches), i.e. the circuit switch 28 and the packet switch 30, which only route local traffic.

The first controller 24 comprises an optical circuit switching channel controller arranged to configure the first set of switch paths 22 through the electrical cross-point switch 20. The first controller thereby configures the switch paths 22 and the electrical cross-point switch 20 in order to cross-connect ingress and egress data traffic signals from and to the circuit switch 28. The first controller 24 can thereby set semi-permanent paths through the electrical cross-point switch 20 for circuit switching channels. In this example, the second controller comprises a medium access controller (MAC controller) arranged to configure the switch paths 22 to separate transit data traffic from traffic to be dropped at the node 10. The MAC controller is also arranged to configure the second set of switch paths 22, to control connections across the electrical cross-point switch 20 for the optical burst switching channels. The MAC controller 26 also configures the switch paths 22 connected to the packet switch 30, to thereby cross-connect ingress optical bursts data to the optical transmitter module 16. The MAC controller 26 is also arranged to configure the switch paths 22 such that multicast data traffic received at the optical receiver module 12 is both dropped at the node 10 and forwarded to the optical transmitter module 16, for onwards transmission to subsequent nodes.

In this embodiment, optical-electrical-optical (OEO) conversion is performed for all transit data traffic, optical-electrical conversion is performed for all locally dropped data signals and electrical-optical conversion is performed for all added traffic signals. All of the routing of the data traffic through the node 10 is therefore performed in the electrical domain.

The MAC controller 26 is arranged to control the configuration of the switch paths 22 in the second set (dedicated to optical burst switching channels). The MAC controller 26 is also arranged to control data transmission on the optical burst switching channels, using MAC protocols and mechanisms arranged to identify transmission opportunities on each optical burst switching channel and to schedule locally added data traffic for transmission.

The MAC controller 26 is arranged to identify time windows available for data transmission on one of the optical burst switching channel DFB lasers 18 and to allocate burst traffic to the time windows. The MAC controller 26 is arranged to select the DFB laser 18 (optical burst switching channel), and thus the wavelength on which the data is to be transmitted, according to the availability of optical transmission bandwidth on each of the optical burst switching channels. The MAC controller 26 can also vary the duration of a time window depending upon the amount of data to be transmitted within that window. Burst data can therefore be assembled into larger data bursts having the same destination. The data may also be assembled into data bursts taking into account QoS information provided within the data. Burst data to be routed to the same destination can be assembled into a larger data burst for transmission by a single burst switching channel DFB laser 18 within a single time window. Alternatively, the MAC controller 26 can schedule the burst data such that data to be routed to the same destination is transmitted on a number of different optical burst switching DFB lasers 18 (optical burst switching channels) within a single time window.

The MAC controller 26 thereby provides data routing based on dynamic, multi-granular, sub-wavelength bandwidth allocation. The burst data traffic being transmitted according to the available optical bandwidth, either within a large data burst in a single window, or across a number of optical burst switching channels within a single window.

The MAC controller 26 is arranged to schedule burst data traffic to optical burst switching DFB lasers 18 according to the bandwidth availability on each of the optical burst switching channels. Data can therefore be transmitted to any destination node on any wavelength, i.e. by any optical burst switching channel, since each node has a corresponding array of DFB lasers 18 and photodiodes 14, and is therefore able to transmit and receive on all wavelengths. The node 10, under the control of the MAC controller 26, is thereby able to dynamically assign the available bandwidth across all of the optical burst switching channel DFB lasers 18, optimising the use of network resources and minimising congestion within a network comprising a plurality of the nodes 10.

The node 10 is also provided with an optical control channel input (not shown) by which control signals may be received by the node 10 on a dedicated, separate WDM channel.

Figure 2:
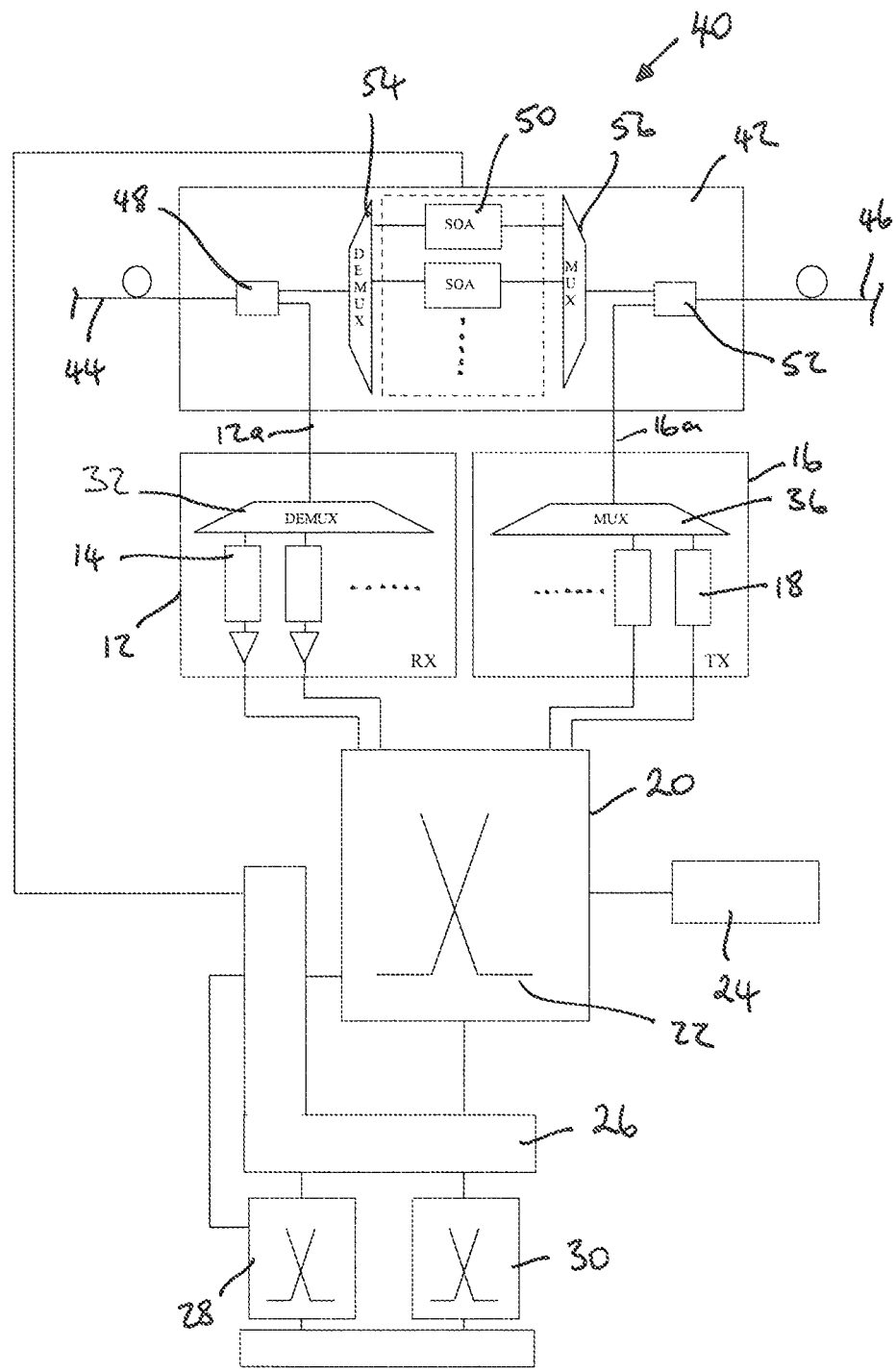
FIG. 2 is a schematic representation of an optical communications network node according to a second embodiment of the invention.

An optical communications network node 40 according to a second embodiment of the invention is shown in FIG. 2. The node 40 of this embodiment is substantially the same as the node 10 of the first embodiment, with the following modifications. The same reference numerals are applied for corresponding features.

In this embodiment, the node 40 further comprises an optical add-block-drop module 42 provided between an input 44 of the node 40 and the optical receiver module 12, and between the optical transmitter module 16 and an output 46 of the node 40. The optical add-block-drop module 42 is arranged to optically separate transit data traffic from data traffic to be dropped at the node 40 and to selectively block wavelength channels corresponding to dropped data traffic. The optical add-block-block module 42 in this example is provided as a photonic integrated device.

The optical add-block-drop module 42 comprises a 3 dB splitter 48, an array of, in this example ten, optical switches 50 and a 3 dB coupler 52. A de-multiplexer 54 is provided between the 3 dB splitter and the array of switches 50, to optically de-multiplex incoming data traffic signals and route them to the appropriate optical switch 50. A multiplexer 56 is provided between the output side of the optical switches 50 and the 3 dB coupler, to multiplex any transit or multicast data traffic for coupling with locally added data traffic at the 3 dB coupler and onwards transmission from the output 46. Only two of the optical switches 50 are shown in the drawing, for reasons of clarity.

The 3 dB splitter serves to split one half of received data traffic signals to the input 12a of the optical receiver module 12 and to transmit the remaining half of the received optical data signals to the de-multiplexer for de-multiplexing and transmission to the SOAs 50.

In this example, the optical switches 50 take the form of semi-conductor optical amplifiers (SOA). The MAC controller 26 is further arranged to control the SOAs 50 such that SOAs corresponding to wavelengths of dropped signals are set to 'off' mode (attenuating), to block the corresponding transmitted portions of the data signals at those wavelengths.

The MAC controller 26 therefore acts to control the SOAs 50 such that optical data channels relating to locally dropped data traffic are blocked/erased, thereby making those channels/wavelength available for locally added traffic routed from the node 40. Transit data traffic and multicast traffic is transmitted on the respective channels, by setting the SOA 50 for each transit traffic channel or multicast traffic channel to 'on' (non-attenuating).

The SOAs 50 are capable of switching between off (attenuating) and on (non-attenuating) in a few tens of nanoseconds, thereby enabling data bursts on optical burst switching channels to be erased or forwarded (transit or multicast data) on a burst basis.

Received data traffic split from the 3 dB splitter to the optical receiver module 12 is de-multiplexed and optical to electrical converted. The MAC controller 26 is further arranged to configure switch paths 22 within the electrical cross-point switch 20 to discard data traffic corresponding to transit data channels, so that the electrical cross-point switch 20 only cross-connects data to be locally dropped.

Locally added data traffic is combined with transit and multicast traffic via the 3 dB coupler 52.

The add-block-drop module 42 therefore acts to separate transit traffic and multicast ongoing traffic from local dropped traffic, with the transit and ongoing multicast traffic passing transparently through the add-block-drop module 42 and only the locally dropped traffic being optical to electrical processed, for electrical processing by the node 10, in the electrical cross-point switch 20 and the packet 30 and circuit 28 switches.

Transit data traffic therefore remains in the optical domain and no electrical processing is performed on it. Processing of data traffic at layers higher than layer 1 is therefore only performed for locally switched traffic, thereby minimising the size required for layer 2 switches. The provision of the optical add-block-drop module 42 allows multicast data to be transmitted on optical burst switching channels whilst maintaining the same wavelength and therefore avoiding bandwidth waste.

Figure 3:
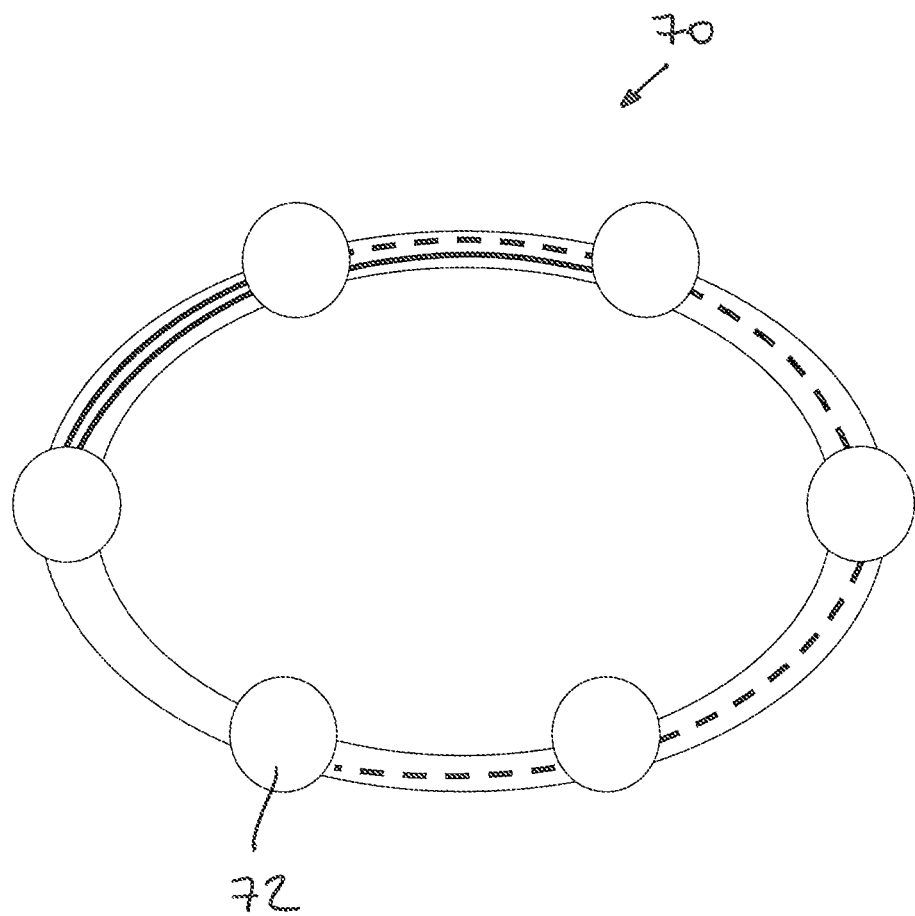
FIG. 3 is a schematic representation of an optical communications network comprising nodes according to the second embodiment of the invention.

FIG. 3 shows a ring network 70 comprising six optical communication network nodes 10, 40 according to the first or second embodiment of the invention. FIG. 3 illustrates that within a single ring network 70 the nodes 72 can be configured to provide circuit switching data channels (shown by the solid lines) between two nodes, a hybrid of circuit and burst data switching channels (shown by the dash lines), or full burst data switching channels between nodes. An optical network 70 comprising nodes 72 according to either the first or second embodiment is therefore able to smoothly migrate from circuit switching, to hybrid circuit and burst switching, to full burst switching modes, thereby enabling inter-working with existing (legacy) optical communications network nodes which are not able to handle burst switching channels.

The ring network 70 also comprises a separate WDM channel by which control data is delivered to the nodes 72.

It will be appreciated that the above describes nodes 10, 40 are also suitable for use in other network architectures, including mesh networks.

Figure 4:
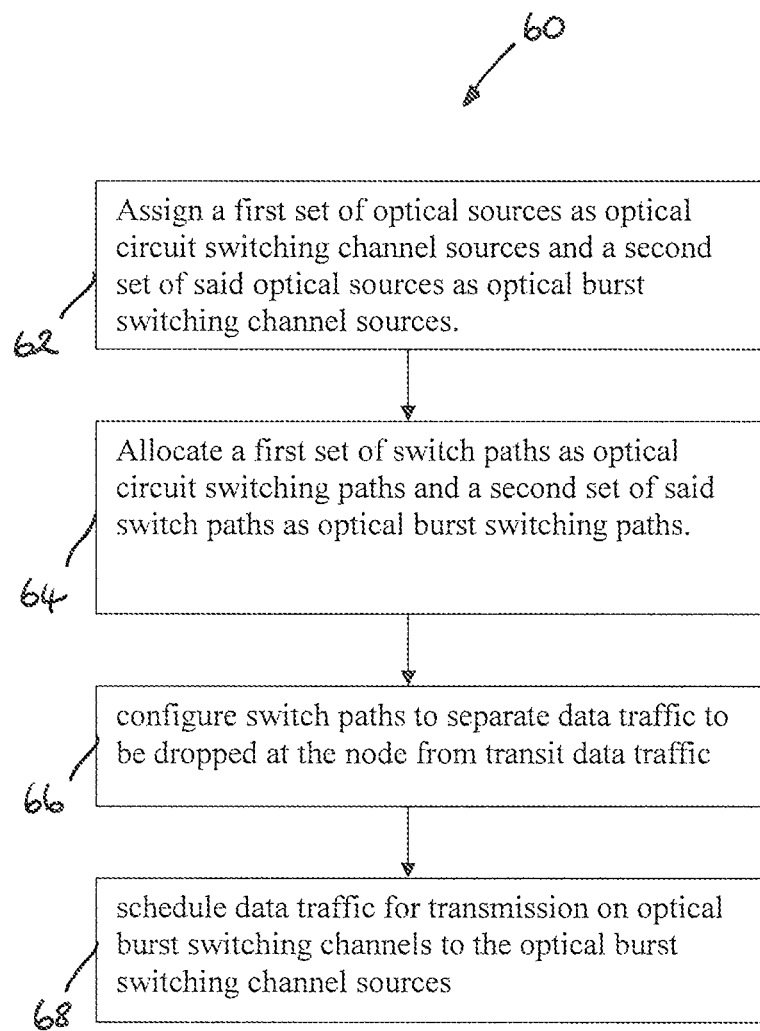
FIG. 4 is a flow chart showing the steps of a method of controlling data transmission between optical communications network nodes of an optical communications network, according to a third embodiment of the invention.

A third embodiment of the invention provides a method 60 of controlling data transmission between optical communication networks nodes of an optical communications network, as illustrated in FIG. 4.

The method 60 is applicable to either of the nodes 10, 40 according to the first and second embodiments and comprises the following steps:
1. assigning a first set of optical sources (DFB lasers 18) as optical circuit switching channel sources and assigning a second set of DFB lasers 18 as optical burst switching channel sources;
2. allocating a first set of switch paths 22 through the electrical cross-point switch 20 as optical circuit switching paths and allocating a second set of switch paths 22 as optical burst switching paths;
3. configuring the switch paths 22 of the electrical cross-point switch 20 to separate data traffic to be dropped at the node 10, 40 from transit data traffic; and
4. scheduling bust data traffic for transmission on optical burst switching channels to the DFB lasers 18 assigned as optical burst switching channel sources.

In this example, the method is implemented by a medium access control (MAC) control protocol provided to the respective node 10, 40 via the MAC layer of the optical communications network. The MAC protocols are transported to a node on a separate WDM channel of the communications network and are processed electronically without the need for optical synchronization with the data traffic.

In the method 60 switch paths 22 are configured such that received multicast data traffic is both dropped at the network node 10, 40 and forwarded to the optical transmitter module 16.

The method 60 identifies time windows available for data transmission by one or more of the optical burst switching channel DFB lasers 18 and allocates burst switching data traffic to the time windows. The DFB laser 18 by which the data is to be transmitted is determined according to the availability of optical transmission bandwidth. The method 60 can vary the duration of a time window depending upon the amount of data to be transmitted within it.

The method 60 allocates the time window to optical burst switching data according to the required optical bandwidth demand of the data traffic. Where the data traffic is to be transmitted to a single destination node, the method allocates available optical bandwidth to that destination according to traffic characteristics of the data, including: guaranteed data rate, maximum data rate, maximum data burst size, maximum delay, and maximum jitter. Where the data traffic is to be transmitted to a plurality of different destination nodes, the available optical bandwidth is allocated between the destination nodes, according to these traffic characteristics.

In the method 60, data may be assembled into larger data bursts for transmission by the burst switching channel DFB lasers 18 based on destination information provided within the data. The data assembly may also depend upon quality of service information provided within the data.

In one embodiment, the method 60 assembles a number of data packets all to be routed to the same destination node into a data burst for transmission by a single burst switching data channel DFB laser 18 in a single time window. In an alternative embodiment, the method allocates burst data to be routed to a single destination node to more than one optical burst switching channel DFB laser 18 for transmission within a single time window, such that the required data capacity is spread across a number of optical burst switching channels within the single window.

The method 60 is able to allocate any of the optical burst switching channel DFB lasers 18 to transmit burst data to a selected destination node, since all of the nodes have a matching array of DFB lasers 18 and photodiodes 14, all operating on the same wavelengths. Burst data can therefore be distributed across a number of the optical burst switching channel DFB lasers 18 within a single time window, thereby optimising utilization of the available bandwidth. The method is able to dynamically assign the available bandwidth across all of the optical burst switching channel DFB lasers 18, since each destination node can receive data on each optical burst switching channel. In contrast to the prior art, in which routing mechanisms are based on wavelength, the method 60 schedules and routes burst data based on a dynamic multi-granular, sub-wavelength bandwidth allocation which efficiently utilizes optical resources. The wavelengths within a network can be assigned to any node for optical burst switching data transmission. Transmission windows to destination nodes receiving optical burst switching data are granted according to their bandwidth demand and quality of service requirements. The assignment of an optical burst switching channel, and therefore wavelength, to a destination node is highly dynamic and is controlled by MAC protocols and mechanisms through the MAC layer of the network.

Within a network, data bursts originating from different source nodes and/or directed to different destination nodes can therefore use the same wavelength, i.e. the same optical burst switching channel. Since wavelengths are not tied to destination nodes, as in the prior art, each wavelength may be shared by different connections between different source and destination nodes within a single window.

Where the method 60 is applied to optical communication network nodes 40 according to the second embodiment described above, the method 60 further comprises configuring the optical add-block-drop module 42 to selectively block wavelength channels corresponding to data traffic to be dropped at the node 40. This is achieved by the method configuring the semi-conductor optical amplifiers 50 to selectively block the dropped wavelength channels.

The method 60 also configures switch paths 22 through the optical cross-point switch 20 such that electronic signals relating to transit data traffic are discarded by the electrical cross-point switch 20.

The described embodiments provide various further advantages, including the following. The optical communications network nodes remove the need for complex three-dimensional optical switching fabrics, as required by prior art devices, and replace these with a simpler, "wavelength blocker like" node architecture. The described nodes do not require the use of expensive fast tunable optical sources. The nodes are colourless (not assigned a specific wavelength) and can be used at any location within a network, thereby reducing inventory costs for a network comprising the described nodes. The described node architecture is compatible with existing mesh networks. The MAC controller and the method implemented by the MAC protocols enables simultaneous management of burst switching and circuit switching channels within a node. The MAC controller and the method implemented by the MAC protocols allows multicasting to be supported by the nodes; this is not possible in traditional optical ring networks. The only function performed in the optical domain by the nodes is burst over wavelengths multiplexing, which is controlled by the MAC controller and the MAC protocols implementing the method.

The invention claimed is:

1. An optical communications network node comprising:
an optical transmitter module comprising a plurality of optical sources each having a different substantially fixed operating wavelength, each optical source being selectively assignable as an optical circuit switching channel source or an optical burst switching channel source;
an optical receiver module comprising a plurality of optical detectors each operable at one of said different substantially fixed operating wavelengths;
an electrical cross-point switch coupled between said optical receiver module and said optical transmitter module and comprising a plurality of switch paths and being selectively configurable to allocate a selected first set of said switch paths for optical circuit switching and to allocate a selected second set of said switch paths for optical burst switching; and
control apparatus arranged to configure the said switch paths to allocate paths to said first and second sets and to separate data traffic to be dropped at the node from transit data traffic, and arranged to schedule data traffic for transmission on optical burst switching channels to the said optical sources assigned as optical burst switching channel sources.

2. An optical communications network node as claimed in claim 1, wherein the control apparatus comprises:
a first controller arranged to configure switch paths in said first set; and
a second controller arranged to configure the said switch paths in said second set, and to schedule data traffic for transmission on optical burst switching channels to the said optical sources assigned as optical burst switching channel sources.

3. An optical communications network node as claimed in claim 2, wherein the second controller is further be arranged to configure the said switch paths such that received multicast data traffic is both dropped at the said network node and forwarded to the optical transmitter module.

4. An optical communications network node as claimed in claim 2, wherein the second controller is arranged to identify one or more time windows available for data transmission by one or more of said optical burst switching channel sources and to allocate said data traffic to said time windows.

5. An optical communications network node as claimed in claim 4, wherein the second controller is arranged to determine the optical burst switching channel source by which the data is to be transmitted, and thus the wavelength on which it is to be transmitted, by the availability of optical transmission bandwidth.

6. An optical communications network node as claimed in claim 4, Wherein the second controller is further arranged to vary the duration of each time window depending upon the amount of data to be transmitted within the said window.

7. An optical communications network node as claimed in claim 3, wherein the second controller is further arranged to assemble packet data for transmission by the said burst switching channel sources into data bursts based on at least one of destination information and quality of service information provided within the said data.

8. An optical communications network node as claimed in claim 7, wherein the second controller is arranged to assemble a number of packets of data all to be routed to the same destination into a data burst for transmission by a single burst switching data channel source, on a single wavelength channel, in a single time window.

9. An optical communications network node as claimed in claim 7, wherein the second controller is arranged to allocate data to be routed to the same destination to more than one optical burst switching channel source for transmission within a single time window.

10. An optical communications network node as claimed in claim 2, wherein the optical communications network node further comprises an optical add-block-drop module provided between an input of the said network node and the said optical receiver module and between the said optical transmitter module and an output of the said network node, the optical add-block-drop module being arranged to optically separate transit data traffic from data traffic to be dropped at the said network node and to selectively block one or more wavelength channels corresponding to dropped data traffic, and the second controller is further arranged to configure the optical add-block-drop module to selectively block the said wavelength channels corresponding to dropped data traffic.

11. An optical communications network node as claimed in claim 10, wherein the optical add-block-drop module comprises an optical splitter, a wavelength demultiplexer, a plurality of optical switches selectively configurable to block said one or more wavelength channels, a wavelength multiplexer, and an optical coupler, the optical splitter being arranged to direct a first portion of a received optical signal to the said optical switches and to direct a remaining portion of the said received optical signal to the optical receiver module.

12. An optical communications network node as claimed in claim 11, wherein the second controller is further arranged to configure the said optical switches to selectively block said one or more wavelength channels.

13. An optical communications network node as claimed in claim 11, wherein the second controller is further arranged to configure the said paths of the electrical cross-point switch to discard transit data traffic provided by the said remaining portion of the said received optical signal.

14. An optical communications network node as claimed in claim 2, wherein the second controller comprises a medium access controller.

15. A method of controlling data transmission between optical communications network nodes of an optical communications network, each said node comprising:
an optical transmitter module comprising a plurality of optical sources each having a different substantially fixed operating wavelength;
an optical receiver module comprising a plurality of optical detectors each opergng at one of said different substantially fixed operating wavelengths;
an electrical cross-point switch coupled between said optical receiver module and said optical transmitter module and comprising a plurality of switch paths;
the method comprising:
assigning a first set of said optical sources as optical circuit switching channel sources and assigning a second set of said optical sources as optical burst switching channel sources;
allocating a first set of said switch paths as optical circuit switching paths and allocating a second set of said switch paths as optical burst switching paths;
configuring the said switch paths to separate data traffic to be dropped at the said node from transit data traffic; and
scheduling data traffic for transmission on optical burst switching channels to the said optical sources assigned as optical burst switching channel sources.

16. A method as claimed in claim 15, wherein the method comprises configuring the said switch paths such that received multicast data traffic is both dropped at the said network node and forwarded to the optical transmitter module.

17. A method as claimed in claim 15, wherein the method comprises identifying one or more time windows available for data transmission by one or more of said optical burst switching channel sources and allocating said data traffic to said time windows.

18. A method as claimed in claim 15, wherein the method comprises determining the optical burst switching channel source by which the data is to be transmitted, and thus the wavelength on which it is to be transmitted, by the availability of optical transmission bandwidth.

19. A method as claimed in claim 17, wherein the method varies the duration of each time window depending upon the amount of data to be transmitted within the said window.

20. A method as claimed in claim 17, wherein the method comprises allocating a said time window to the said data according to a required optical bandwidth demand of the said data traffic.

21. A method as claimed in claim 17, wherein the method comprises assembling a number of packets of data all to be routed to the same destination into a data burst for transmission by a single burst switching data channel source, on a single wavelength channel, in a single time window.

22. A method as claimed in claim 17, wherein the method comprises allocating data to be routed to the same destination to more than one optical burst switching channel source for transmission within a single time window.

23. A method as claimed in claim 15, wherein the optical communications network node further comprises an optical add-block-drop module provided between an input of a said network node and the said optical receiver module and between the said optical transmitter module and an output of a said network node and the method further comprises configuring the optical add-block-drop module to selectively block wavelength channels corresponding to data traffic to be dropped at the said network node.

24. A method as claimed in claim 23, wherein the method configures the said switch paths to separate data traffic to be dropped at the said node from transit data traffic by configuring the said paths of the electrical cross-point switch to discard transit data traffic.

25. A method as claimed in claim 15, wherein the method is implemented by a control protocol provided to a said node via a layer of said optical communications network.

26. A method as claimed in claim 25, wherein the control protocol comprises a medium access control protocol and the said layer may comprise the medium access control layer of the said optical communications network.

27. A computer program product comprising program code for performing the steps of the method as claimed in claim 15.

28. A data carrier having computer readable instructions embodied therein for providing access to resources available on a computer, the computer readable instructions comprising instructions to cause the computer to perform the steps of the method as claimed in claim 15.

* * * * *

UNITED STATES PATENT AND TRADEMARK OFFICE
CERTIFICATE OF CORRECTION

PATENT NO. : 8,861,955 B2  Page 1 of 1
APPLICATION NO. : 13/147037
DATED : October 14, 2014
INVENTOR(S) : Testa et al.

It is certified that error appears in the above-identified patent and that said Letters Patent is hereby corrected as shown below:

In the drawings

In Fig. 4, Sheet 4 of 4, for Tag "66", in Line 2, delete "traffic" and insert -- traffic. --, therefor.

In Fig. 4, Sheet 4 of 4, for Tag "68", in Line 3, delete "sources" and insert -- sources. --, therefor.

In the specification

In Column 7, Line 6, delete "DESCRIPTION" and insert -- DETAILED DESCRIPTION --, therefor.

In Column 10, Lines 43-44, delete "circuit 28 switches." and insert -- circuit switches 28. --, therefor.

In the claims

In Column 13, Line 39, in Claim 3, delete "further be" and insert -- further --, therefor.

In Column 13, Line 55, in Claim 6, delete "Wherein" and insert -- wherein --, therefor.

In Column 14, Line 50, in Claim 15, delete "opergng" and insert -- operating --, therefor.

Signed and Sealed this
Sixteenth Day of February, 2016

Michelle K. Lee
*Director of the United States Patent and Trademark Office*